United States Patent
Postel

[11] Patent Number: 5,917,406
[45] Date of Patent: Jun. 29, 1999

[54] ANTI-THEFT DEVICE FOR MOTOR VEHICLES

[76] Inventor: Ifim Postel, 91-48 88 Rd. 2J, Woodhaven, N.Y. 11421

[21] Appl. No.: 08/871,661

[22] Filed: Jun. 9, 1997

[51] Int. Cl.⁶ .................................................. B60R 25/10
[52] U.S. Cl. ........................ 340/426; 340/425.5; 340/438
[58] Field of Search ............................... 340/426, 425.5, 340/438, 457, 428

[56] References Cited

U.S. PATENT DOCUMENTS

| | | | |
|---|---|---|---|
| 3,653,457 | 4/1972 | Lopez | 180/114 |
| 3,834,484 | 9/1974 | Sangster | 180/114 |
| 4,665,692 | 5/1987 | Inaba | 60/324 |
| 4,696,368 | 9/1987 | Hummel et al. | 180/309 |
| 4,699,244 | 10/1987 | Bergquist et al. | 181/226 |
| 5,052,204 | 10/1991 | Millar | 70/256 |
| 5,373,287 | 12/1994 | Doublet | 340/825.69 |
| 5,414,409 | 5/1995 | Voosen et al. | 340/541 |
| 5,612,878 | 3/1997 | Joao et al. | 364/424.045 |

*Primary Examiner*—Jeffery A. Hofsass
*Assistant Examiner*—Toan N. Pham
*Attorney, Agent, or Firm*—Zoya V. Chernina

[57] ABSTRACT

An anti-theft device for a motor vehicle comprises in combination a blocking member, e.g., a butterfly damper, rotationally disposed within an internal space of an exhaust pipe to control an exhaust gas flow, reduction gear for rotation the blocking member from opened to closed position and in reverse direction, an electrical control switch and a mechanical switch for actuating and de-actuating device. The blocking member, when is in closed position, shuts off the exhaust gas flow from an engine of the vehicle and consequently disables the engine, thereby preventing an unauthorized operation of the vehicle.

5 Claims, 4 Drawing Sheets

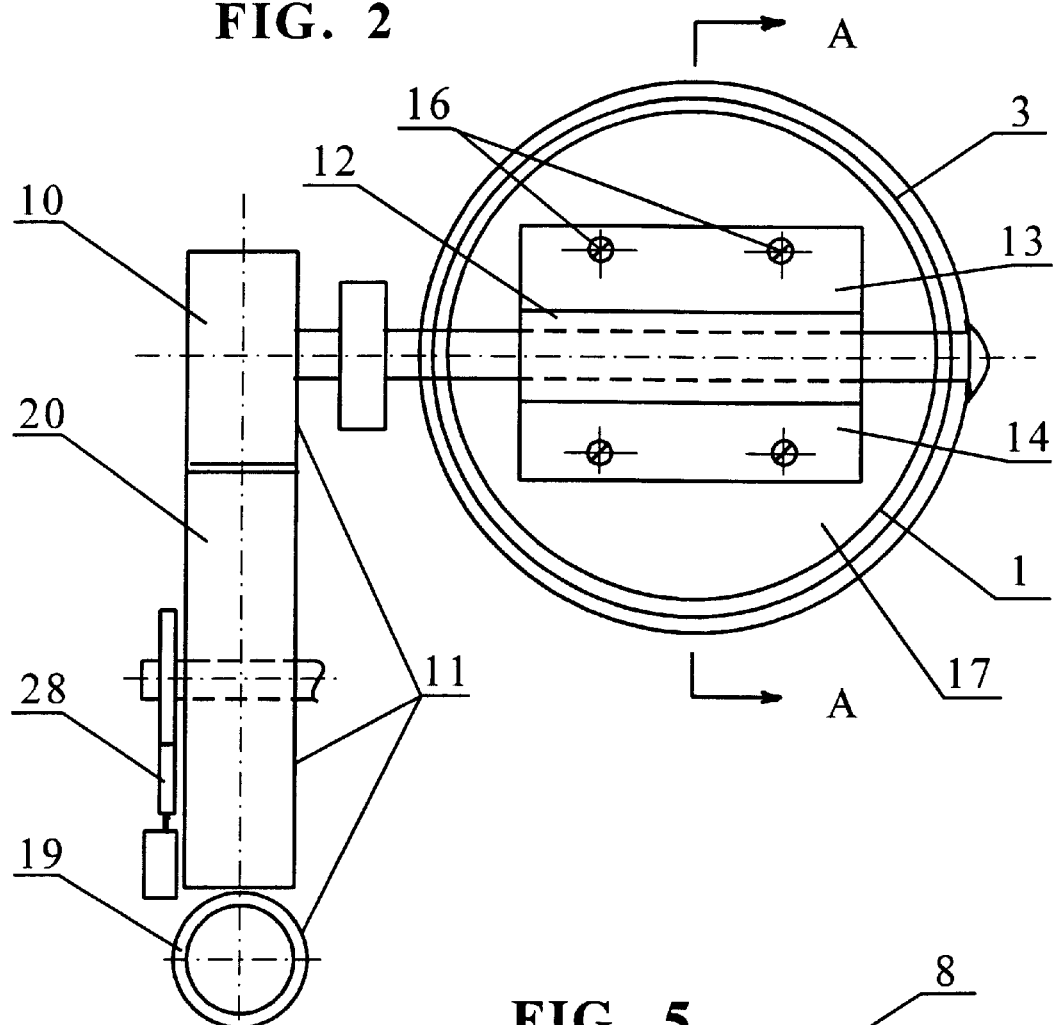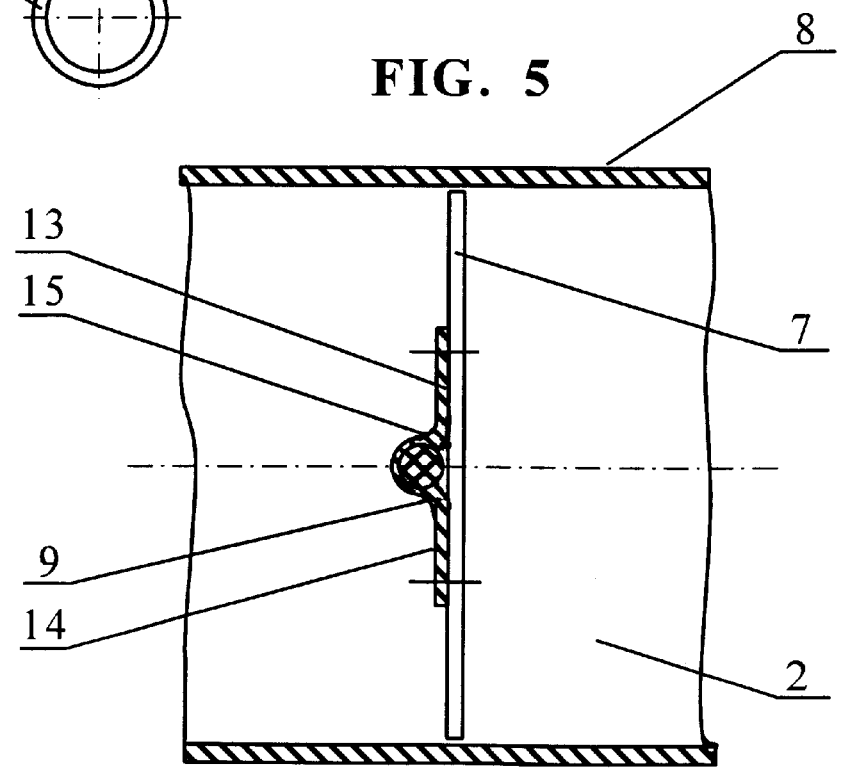

ANTI-THEFT DEVICE FOR MOTOR VEHICLES

FIELD OF THE INVENTION

The present invention relates generally to anti-theft devices for preventing unauthorized use of a motor vehicle, and more specifically to a device which disables an engine of vehicle by means of shutting off an exhaust gas flow from exhaust system.

DESCRIPTION OF PRIOR ART

Despite presently coming wide variety of anti-theft devices, the problem of vehicle theft is on the rise. Devices that have been employed mostly intended for disabling the vehicle's electrical system of different parts thereof and rely on complicated electrical schemes, sensitive electronics and electromagnetic wave transmitters such as a cellular telephone. The known prior arts suffer from following major deficiencies that are common for all of them. First, they can easily be bypassed by destroying circuitry of the vehicle which is accessible and/or readily detected as well on the dashboard or in the hood. Second, they generally required automotive expert installation because of their complexity and, often, necessity of alteration the existing systems. Third, these prior art devices are very expensive in manufacturing and accordingly high in prices of sale. Fourth, no one of the discussed above devices is adapted to be utilized in the vehicle's exhaust system.

Examples of known anti-theft devices are disclosed in U.S. Pat. Nos. 5,041,810 issued on Aug. 20, 1991 to Motohiro Gotanda; 5,280,268 issued on Jan. 18, 1994 to Edward J. Matthews; 5,370,201 issued on Dec. 6, 1994 to Hajime Inubushi; 5,529,142 issued on Jun. 25, 1996 to John E. Burke, III.

SUMMARY OF THE INVENTION

It is thus a primary object of the present invention to provide an anti-theft device for motor vehicles that is simple and reliable in both manufacturing and using.

It is another object of the proposed invention to provide the anti-theft device that could be easily installed by the trained automotive technician.

It is a further object of the presented invention to provide anti-theft device which has low cost of manufacture with regard to material and labor as well, and, accordingly, to sale's price, so that making the proposed device available for extensive consuming.

With a view to attaining the above mentioned objects, the presented invention is constructed in the following manner. The anti-theft device for a motor vehicle that includes an engine and a muffler with an exhaust pipe comprises in combination: a blocking member rotationally disposed along the length and within an internal space of said exhaust pipe to control an exhaust gas flow from the engine; gear means positioned on the outer surface of the exhaust pipe for rotating the blocking member from opened to closed position to shut off the exhaust gas flow from the engine thereby stopping operation of the engine; and for easy restoring exhaust gas flow from the engine when the blocking member rotated in reverse direction to an opened position by means of defining a passage within the internal space of the exhaust pipe; a source of electrical energy positioned adjacent gear means for operating thereof; an electrical control switch locating in a concealed place and having an electrical circuit with plurality of contact groups for actuating and de-actuating the device, so that selectively enabling and disabling the vehicle engine; a mechanical switch sequentially interacted with gear means and the elements of the contact groups.

The foregoing objects and other objects as well as the particular construction of the anti-theft device for the motor vehicle will become more apparent and understandable from the following detail description thereof when read in conjunction with the accompanying drawings.

BRIEF DESCRIPTION OF THE ACCOMPANYING DRAWINGS

FIG. 2 is a side elevation view showing the anti-theft device according to the present invention with the blocking member in closed position;

FIG. 5 is a sectional view taken along line 1—1 on FIG. 2 of the anti-theft device showing the fixing of the blocking member.

DETAILED DESCRIPTION OF THE PREFERRED EMBODIMENT

Figure 1:
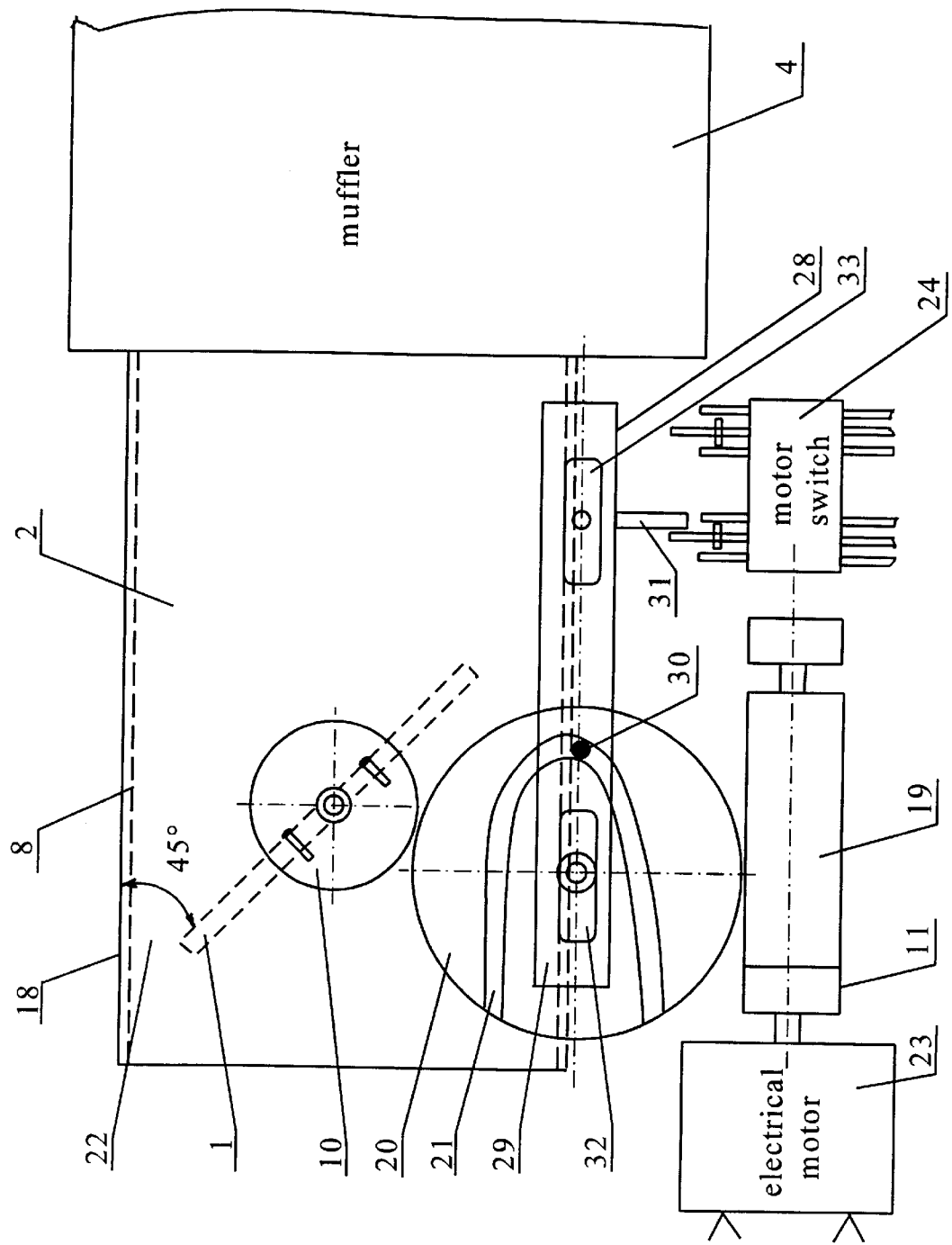
FIG. 1 is a front view showing the anti-theft device according to the present invention with the blocking member in half/opened position.
Figure 3:
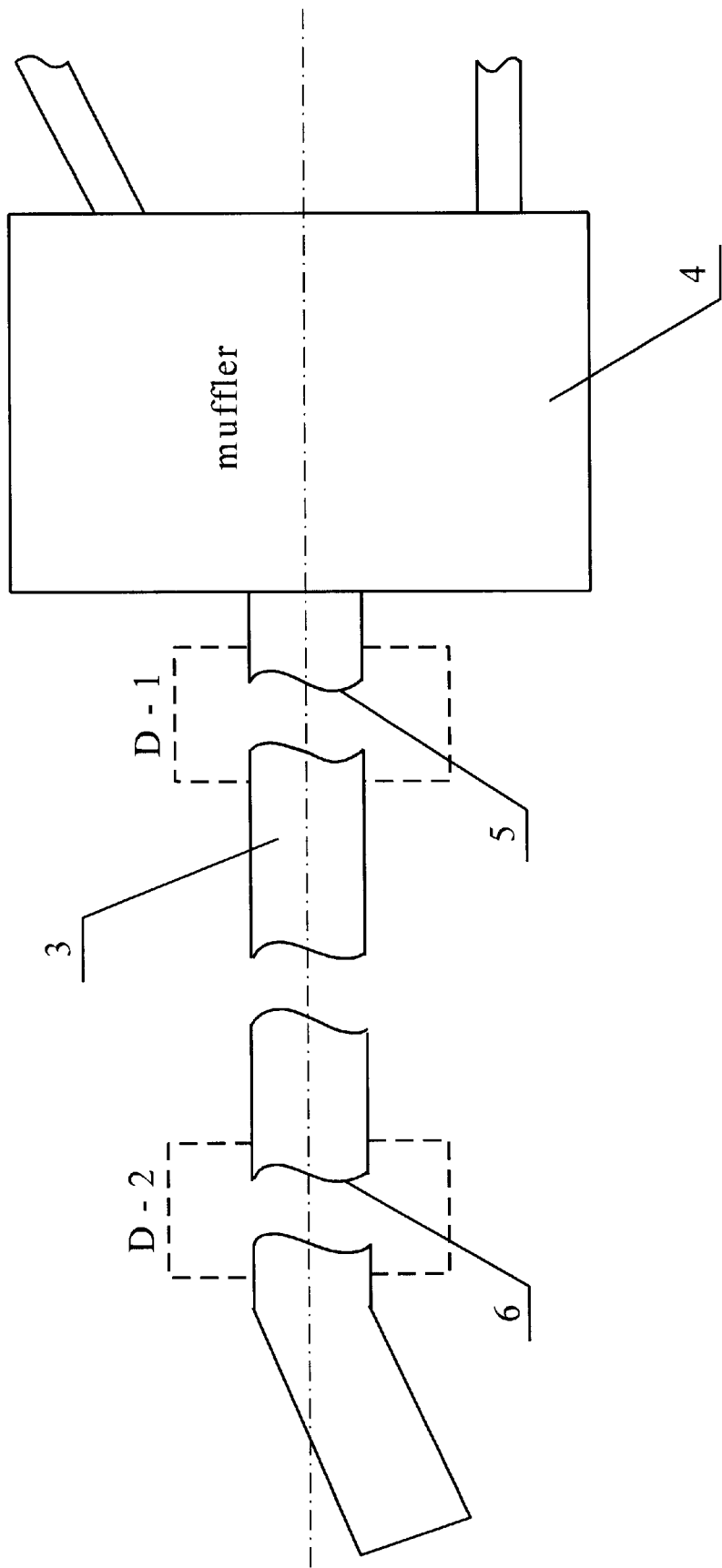
FIG. 3 is a diagram showing the variety of possible installments of the anti-theft device according to the present invention.

Turning now to the drawing, FIG. 1 shows a blocking member, generally designated at 1, that is rotationally disposed along the length and within an internal space 2 of an exhaust pipe 3 of a muffler 4 (not shown in its entirety). Specifically turning to the FIG. 3, the blocking member preferably is positioned in the pipe joint 5 (pos. D-1), immediately after muffler 4 that allows to expedite the process of disabling the engine (see detail explanation hereinbelow) as well as in the pipe joint 6 (pos. D-2). The final decision where to position the blocking member is dictated by particular type of the vehicle. The blocking member 1 is represented by a butterfly damper 7. To fit the standard exhaust pipe, the butterfly damper 7 has a diameter of a size substantially equal to the diameter of the inner surface 8 of the exhaust pipe 3. Specifically turning to the FIG. 5, the butterfly damper 7 is rigidly fixed on a shaft 9 of the pinion 10 of a reduction gear 11 by means of an arcuate shaped plate 12. The plate 12 is formed to have two legs 13 and 14 defined integral with plate's walls 15. The plate 12 embracing shaft 9 is screwed with threaded bolts 16 to a top side surface 17 of the damper 7 by legs 13 and 14. It is understood, that dimensions of the sizes of the butterfly damper 7, such as diameter and thickness, could be adapted to any measurements that deemed to be equitable for the particular type of the exhaust system.

The reduction gear 11 of the proposed invention is positioned on the outer surface 18 of the exhaust pipe 3 for rotating the butterfly damper 7 from opened to closed position and in reverse direction. The gear 11 includes worm shaft 19 engaged with a drive wheel 20, in turn being engaged with the pinion 10. The drive wheel is formed with a grove of an elliptic shape 21. The drive wheel 20 and pinion 10 have the two-to-one gear ratio. The quantity of the ratio is determined in view of selecting the most optimal working parameters for butterfly damper 7, as to rotate that damper from closed position that conditions in the exhaust gas flow being shut off from the engine (not shown), to opened position when damper 7 defines a passage 22 within an internal space 2 sufficient for restoring the exhaust gas flow from the engine. In view of attaining this result, the working angular position of the butterfly damper is equal to 90°. The gear ratio equal to two-to-one causes an increasing of torque transmitted from the drive wheel 20 to the pinion 10, so that enhancing the resistance of butterfly damper 7 to the exhaust gas flow and preventing the reverse rotation at an angle different from 90°.

The reduction gear 11 is operated by a source of electrical energy 23, preferably an electrical motor of brand MXN 12 ED, 12 V manufactured by Hitachi company.

The electrical control switch 24 is used for actuating and de-actuating the device, thereby selectively enabling and disabling the engine of the vehicle. Specifically turning to the FIG. 4, the switch 24 is provided with four contact groups. Two of them powered from the vehicle battery 25 and correspond respectively to the "on" and "of" positions of the switch 24. The first group includes contact elements 1'-2' and 3'-4', and the second group includes contact elements 5'-6', and 7'-8'. Thereat, the contact elements 2' and 4' of the first group, and contact elements 6' and 8' of the second group are fixedly positioned. The third group includes contact elements I, II, III and the fourth group includes contact elements 1", 2", 3". Thereat, the contact elements II, III and 2", 3" are fixedly positioned. Additionally, the contact elements of the third and the fourth of contact groups have normally closed working position. Contact elements II and 3" are connected respectively to two indicators 26 and 27 that responsive to an "opened" and "closed" position of the butterfly damper 7. For this purpose two lights having "red" and "green" color, respectively, could be employed. The contacts element III and 1" and contact elements 3' and 7' are interconnected to the electrical motor 23. The remaining contact elements of all groups are interconnected to each other. The electrical control switch 24 could be located in any concealed place that deemed to be convenient for the authorized user, for the preferred embodiment it is located under the driver's sit (not shown). The lights 26 and 27 are positioned on the dashboard of the vehicle (not shown).

Figure 4:
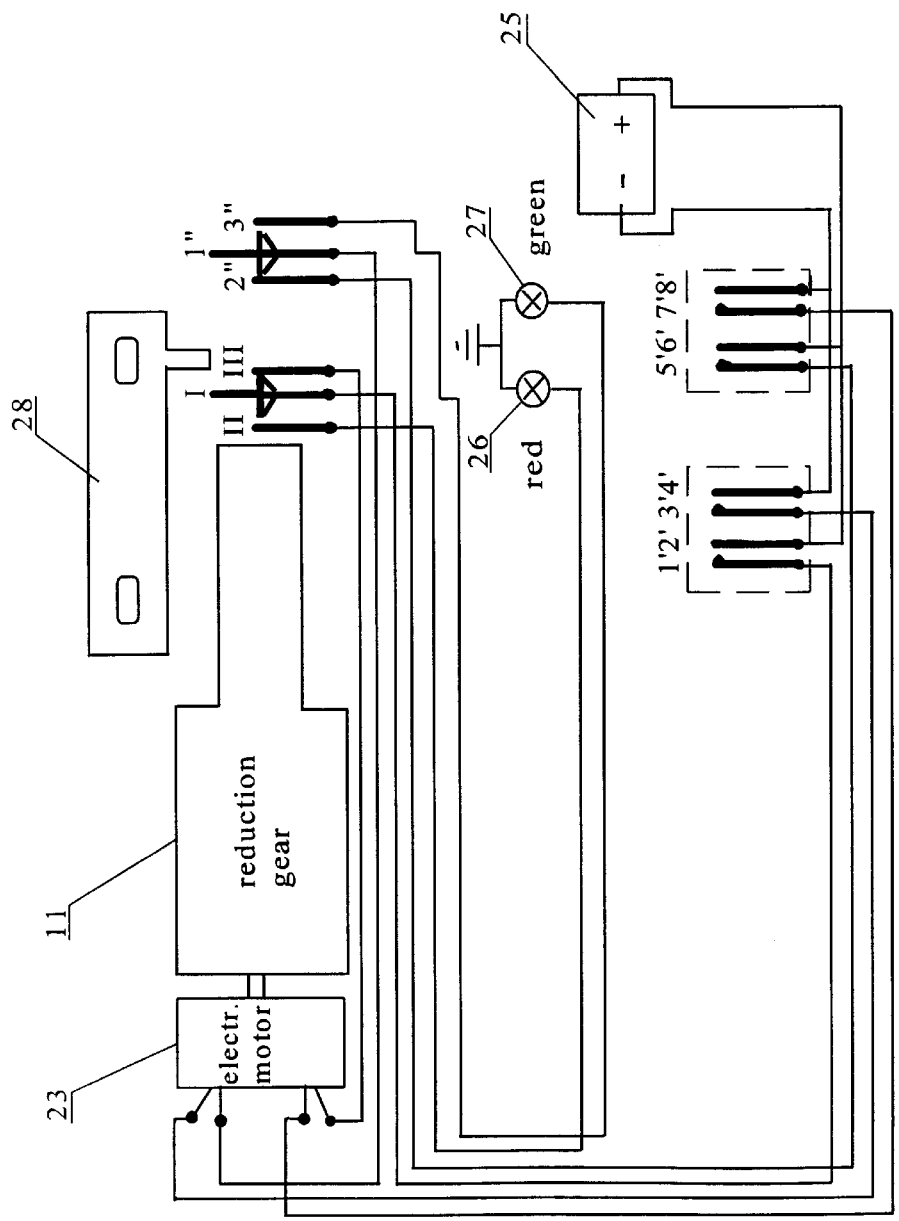
FIG. 4 is a schematic view showing the electrical circuit of the electrical control switch with contact groups.

The anti-theft device is provided with a mechanical switch, generally designated as 28 on FIGS. 1, 2 and 4, that sequentially interacting with the reduction gear 11 and, as was mentioned above, with contact elements of the third and the fourth of contact groups. For this purpose, the switch 28 is a rectangular plate 29 provided with two pins 30 and 31, and two longitudinal oval through-holes 32 and 33. The pins 30 and 31, and holes 32 and 33 are located in respective adjacency with each other at the opposite ends of the plate 29. The pin 30 is positioned in a plane perpendicular with a longitudinal axis of the plate 29, and pin 31 is positioned in a plane parallel with thereof. The pin 30 is slidably received by the elliptic grove 21 of reduction gear 11 by means of which the plate 29 is reciprocally movable in the plane coinciding with its longitudinal axis. The reciprocal movement of the plate 29 causes consequent selective engaging and disengaging of the pin 31 with contact elements I, II, III and 1", 2", 3" thereby activating or deactivating the electrical motor 23 and, simultaneously, selectively energizing lights 26 and 27. The holes 32 and 33 serve for positioning the plate 29 on a basis of the device (not shown). The length of the holes is determined in view to make feasible the reciprocal movement and, simultaneously, restrict this movement for a distance required for mentioned engagement of the pin 31 with the selected contact elements.

The butterfly damper 7 and the reduction gear 11 of the anti-theft device for motor vehicles, as designed, are manufactured from stainless steel, but final decision on material for these parts of the device as well as for the mechanical switch and other parts will be given upon marketing and consuming issues.

The parts of the device such as the electrical motor, the reduction gear, switches with associated components and two indicators are mounted on the same base and protected by waterproof, dust-proof cover.

OPERATION

When an authorized driver leaves his or her car, the switch 24 is set on position "on", thereat contact elements 1'-2', 3'-4' of the first contact group are closed. Power initiated by battery 25 comes to the contact group with contact elements I, II, III. Contact elements and I and III also are in closed position. Power then goes to the electrical motor 23 through contact element III thereby polarizing the motor in straight polarity (+)-(−). Energizing of the electrical motor 23 causes the activation of the reduction gear 11. The reduction gear, accordingly, rotates butterfly damper 7 to closed position conditioning in shutting off of the exhaust gas flow from the engine. Accumulation of exhaust gases in vehicle's combustion chamber extinguishes combustion of fuel, so that stops the engine from staring. The plate 29 moves toward the contact element I and press it back with pin 31 to contact element II thereby braking the powering of the electrical motor 23. Simultaneously, closed chain between contact elements I and II allows to power the red light 26, so that notifying the driver that the device is activated. Turning on the switch in position "off" causes the power to go through contact elements 5'-6', 7'-8', accordingly, conditioning in the reverse polarity of the electrical motor 23 and activation thereof through contact elements 1" and 2". Thereat, reduction gear 11 rotates the butterfly damper 7 from closed to opened position when the angular position of the damper 7 within the exhaust pipe 3 corresponds to 0°. In this position, the butterfly damper 7 defines a passage 22 within an internal space 2 of the exhaust pipe 3 which is sufficient to restore exhaust gas flow from the engine thereby resuming its function. Simultaneously, the plate 29 moves toward the contact elements 1", 2", 3" pressing back contact element 1" with pin 31 from contact element 2" to contact element 3". The closed chain between contact elements 1" and 3" brakes the power coming to the electrical motor 23 and powers the green light 27 so that notifying the authorized driver that the device is deactivated.

Foregoing description of the present invention demonstrates the ability of the proposed anti-theft device that could be successfully employed for preventing unauthorized use of the vehicle. Although this description was done in connection with the preferred embodiment thereof, it will be appreciated by those skilled in the art that some substitution or additions may be made without departing from the spirit and scope of the invention as defined in the appended claims.

I claim:

1. An anti-theft device for a motor vehicle that includes an engine and exhaust pipe, said exhaust pipe having an outer surface and an inner surface, comprising in combination:

an exclusively internal blocking member rotationally disposed along the length and within an internal space of said exhaust pipe to control an exhaust gas flow from said engine, a gear positioned on said outer surface of said exhaust pipe for rotating said blocking member from opened to closed position and in reverse direction, said blocking member when in closed position shuts off the exhaust gas flow, thereby causing to stop operation of said engine, and when in opened position defines a passage within said internal space while being remained therein for restoring said exhaust gas flow, thereby allowing to start operation of said engine, an electrical control switch located in a concealed place, the switch having an electrical circuit with a plurality of contact groups for actuating and de-actuating the device, a mechanical switch sequentially interacted with said gear and said contact groups, the mechanical switch being in a form of a reciprocally movable rectangular plate provided with a first pin and a second pin, the gear comprising a drive wheel, the drive wheel being formed with a groove of an elliptic spiral shape, said groove being adapted to slidably receive said first pin for performing the reciprocal movement of said rectangular plate in a plane coinciding with a longitudinal axis thereof, said second pin selectively engaging respective elements of said contact groups in response to said reciprocal movement, whereby closing of the respective contact group is achieved.

2. An anti-theft device for a motor vehicle according to claim 1, wherein said rectangular plate further provided with two longitudinal oval through-holes, each said pin adjacent the one of said through-holes and located at opposite ends of said rectangular plate, said first pin being positioned in a plane perpendicular with the longitudinal axis of said rectangular plate, and said second pin being positioned in a plane parallel with thereof.

3. An anti-theft device for a motor vehicle according to claim 1, wherein said gear further comprising a worm shaft and a pinion, said drive wheel and said pinion having a ratio sufficient for enhancing the resistance to said exhaust gas flow and preventing the rotation of said blocking member at an angle different from 90°.

4. An anti-theft device for a motor vehicle according to claim 1, wherein said blocking member is a butterfly damper, said butterfly damper having a diameter of a size substantially equal to the diameter of said inner surface of said exhaust pipe.

5. An anti-theft device for a motor vehicle according to claim 1, wherein the selected elements of said contact groups is connected to two indicators respectively responsive to opened and closed position of the blocking member.

* * * * *